US006785372B1

(12) United States Patent
Moss et al.

(10) Patent No.: US 6,785,372 B1
(45) Date of Patent: Aug. 31, 2004

(54) METHOD AND APPARATUS FOR PROVIDING PREPAID LOCAL TELEPHONE SERVICES IN METERED STATES

(75) Inventors: John Moss, Lake Zurich, IL (US); Dianna Tiliks, Elk Grove, IL (US); Gordon Blumenschein, Woodridge, IL (US); James Kovarik, Batavia, IL (US)

(73) Assignee: SBC Properties, L.P., Reno, NV (US)

( * ) Notice: Subject to any disclaimer, the term of this patent is extended or adjusted under 35 U.S.C. 154(b) by 465 days.

(21) Appl. No.: 09/616,667

(22) Filed: Jul. 14, 2000

Related U.S. Application Data

(63) Continuation-in-part of application No. 09/417,266, filed on Oct. 12, 1999.

(51) Int. Cl.[7] ............................................. H04M 15/00
(52) U.S. Cl. ............................. 379/114.2; 379/114.14; 379/127.02; 379/210.02
(58) Field of Search ........................ 379/88.16, 112.01, 379/114.01, 114.14, 114.15–114.21, 114.24, 114.28, 11.29, 115.01, 115.02, 121.01, 126, 127.01, 127.02, 133, 139, 140, 145, 210.02, 220.01, 221.08, 221.09, 221.12

(56) References Cited

U.S. PATENT DOCUMENTS

| | | | |
|---|---|---|---|
| 2,298,487 A | 10/1942 | Kiner | |
| 2,615,972 A | 10/1952 | Hubbard | |
| 3,022,381 A | 2/1962 | Pferd | |
| 3,087,018 A | 4/1963 | Pferd | |
| 3,169,168 A | 2/1965 | Capranica | |
| 3,571,799 A | 3/1971 | Coker, Jr. et al. | |
| 3,594,727 A | 7/1971 | Braun | |
| 3,662,111 A | 5/1972 | Rubinstein | |

(List continued on next page.)

OTHER PUBLICATIONS

Chad Hazam et al., "White Paper On Prepaid Local Phone Services", National ALEC Association/Prepaid Communications Association, printed from the Internet address http://www.nala-pca.org/whitepaper1.shtml, Aug. 1999, 11 pages.

Greg C. Carr, *Voice Processing Applications For The Cental Office*, TE&M Special Report, dated Mar. 1, 1989, 4 pages.

Thomas W. Brown et al., *The Building of Intelligent Networks, Architecture and Systems From Alcatel*, dated 1989, pp. 5 to 22.

Jennifer Knapp et al., *Prepaid Providers Take Risk Out Of Dial Tone Business*, dated May 1999, pp. 68 to 70.

Copy of Ameritech Corporation brochure for "Pick Up & Go Cellular" prepaid cellular telephone service, dated 1998, 2 pages.

Stewart D. Personick, "Digital Transmission Building Blocks", Jan. 1980, vol. 18, No. 1, pp. 27–36, IEE Communications Magazine.

*Primary Examiner*—Roland G. Foster
(74) *Attorney, Agent, or Firm*—Brinks Hofer Gilson & Lione

(57) ABSTRACT

A method and apparatus for providing prepaid local telephone services is provided. The method includes determining if a subscriber is making a qualified local telephone call, checking to see if a maximum number of calls have been made by the subscriber and decrementing a call counter if a telephone call in connected. The system includes a switch for receiving telephone calls and identifying subscribers and qualified telephone calls. In addition, the system includes a telephone network element in communication with the switch, the telephone network element having logic for identifying local telephone calls, a notification timer configured to remove the telephone network element from a telephone call after a predetermined period of time, and a call counter for monitoring a number of local calls permitted to a subscriber.

12 Claims, 7 Drawing Sheets

U.S. PATENT DOCUMENTS

| | | |
|---|---|---|
| 3,665,397 A | 5/1972 | DiNapoli et al. |
| 3,702,392 A | 11/1972 | St. Jean |
| 3,723,655 A | 3/1973 | Zucker et al. |
| 3,728,522 A | 4/1973 | Norwich |
| 3,752,904 A | 8/1973 | Waterbury |
| 3,769,463 A | 10/1973 | Graham et al. |
| 3,784,793 A | 1/1974 | Ito et al. |
| 3,787,623 A | 1/1974 | Stephenson, Jr. |
| 3,929,278 A | 12/1975 | Balavoine et al. |
| 3,937,925 A | 2/1976 | Boothroyd |
| 3,959,607 A | 5/1976 | Vargo |
| 3,982,103 A | 9/1976 | Goldman |
| 4,023,014 A | 5/1977 | Goldberg |
| 4,048,475 A | 9/1977 | Yoshida |
| 4,068,213 A | 1/1978 | Nakamura et al. |
| 4,197,986 A | 4/1980 | Nagata |
| 4,326,123 A | 4/1982 | Hosterman |
| 4,371,751 A | 2/1983 | Hilligoss, Jr. et al. |
| 4,404,433 A | 9/1983 | Wheeler et al. |
| 4,417,100 A | 11/1983 | Carlson et al. |
| 4,439,636 A | 3/1984 | Newkirk et al. |
| 4,492,820 A | 1/1985 | Kennard et al. |
| 4,510,350 A | 4/1985 | Wagner et al. |
| 4,517,412 A | 5/1985 | Newkirk et al. |
| 4,518,824 A | 5/1985 | Mondardini |
| 4,525,601 A | 6/1985 | Bartnich et al. |
| 4,577,066 A | 3/1986 | Bimonte et al. |
| 4,585,904 A | 4/1986 | Mincone et al. |
| 4,587,379 A | 5/1986 | Masuda |
| RE32,263 E | 10/1986 | Kaminsky |
| 4,706,275 A | 11/1987 | Kamil |
| 4,717,815 A | 1/1988 | Tomer |
| 4,743,892 A | 5/1988 | Zayle |
| 4,756,020 A | 7/1988 | Fodale |
| 4,776,000 A | 10/1988 | Parienti |
| 4,777,646 A | 10/1988 | Harris |
| 4,799,255 A | 1/1989 | Billinger et al. |
| 4,853,952 A | 8/1989 | Jachmann et al. |
| 4,860,346 A | 8/1989 | Mellon |
| 4,866,761 A | 9/1989 | Thornborough et al. |
| 4,877,947 A | 10/1989 | Mori |
| 4,879,744 A | 11/1989 | Tasaki et al. |
| 4,897,870 A | 1/1990 | Golden |
| 4,935,956 A | 6/1990 | Hellwarth et al. |
| 4,964,156 A | 10/1990 | Blair |
| 4,975,942 A | 12/1990 | Zebryk |
| 5,003,584 A | 3/1991 | Benyacar et al. |
| 5,003,585 A | 3/1991 | Richer |
| 5,023,868 A | 6/1991 | Davidson et al. |
| 5,036,533 A | 7/1991 | Carter et al. |
| 5,068,891 A | 11/1991 | Marshall |
| 5,077,788 A | 12/1991 | Cook et al. |
| 5,101,098 A | 3/1992 | Naito |
| 5,109,405 A | 4/1992 | Morganstein |
| 5,128,979 A | 7/1992 | Reich et al. |
| 5,138,650 A | 8/1992 | Stahl et al. |
| 5,146,067 A | 9/1992 | Sloan et al. |
| 5,155,342 A | 10/1992 | Urano |
| 5,161,180 A | 11/1992 | Chavous |
| 5,163,086 A | 11/1992 | Ahearn et al. |
| 5,166,972 A | 11/1992 | Smith |
| 5,192,947 A | 3/1993 | Neustein |
| 5,193,110 A | 3/1993 | Jones et al. |
| 5,195,126 A | 3/1993 | Carrier et al. |
| 5,204,894 A | 4/1993 | Darden |
| 5,222,120 A | 6/1993 | McLeod et al. |
| 5,222,125 A | 6/1993 | Creswell et al. |
| 5,225,666 A | 7/1993 | Amarena et al. |
| 5,241,586 A | 8/1993 | Wilson et al. |
| 5,264,689 A | 11/1993 | Maes et al. |
| 5,266,782 A | 11/1993 | Alanara et al. |
| 5,309,504 A | 5/1994 | Morganstein |
| 5,311,572 A | 5/1994 | Friedes et al. |
| 5,315,636 A | 5/1994 | Patel |
| 5,327,482 A | 7/1994 | Yamamoto |
| 5,333,173 A | 7/1994 | Seazholtz et al. |
| 5,339,351 A | 8/1994 | Hoskinson et al. |
| 5,359,182 A | 10/1994 | Schilling |
| 5,375,161 A | 12/1994 | Fuller et al. |
| 5,409,092 A | 4/1995 | Itako et al. |
| 5,416,833 A | 5/1995 | Harper et al. |
| 5,436,957 A | 6/1995 | McConnell |
| 5,440,621 A | 8/1995 | Castro |
| 5,448,633 A | 9/1995 | Jamaleddin et al. |
| 5,479,494 A | 12/1995 | Clitherow |
| 5,511,114 A | 4/1996 | Stimson et al. |
| 5,524,145 A | 6/1996 | Parker |
| 5,524,146 A | 6/1996 | Morrisey et al. |
| 5,572,579 A | 11/1996 | Orriss et al. |
| 5,586,175 A * | 12/1996 | Hogan et al. ........... 379/114.14 |
| 5,586,177 A * | 12/1996 | Farris et al. ................. 379/230 |
| 5,598,460 A | 1/1997 | Tendler |
| 5,613,006 A | 3/1997 | Reese |
| 5,659,605 A | 8/1997 | Voit et al. |
| 5,666,405 A | 9/1997 | Weber |
| 5,719,926 A | 2/1998 | Hill |
| 5,729,598 A | 3/1998 | Kay |
| 5,737,701 A * | 4/1998 | Rosenthal et al. ........... 455/411 |
| 5,749,052 A * | 5/1998 | Hidem et al. ................ 455/406 |
| 5,761,278 A | 6/1998 | Pickett et al. |
| 5,762,376 A | 6/1998 | Taskett |
| 5,774,533 A | 6/1998 | Patel |
| 5,774,535 A | 6/1998 | Castro |
| 5,787,429 A | 7/1998 | Nikolin, Jr. |
| 5,790,636 A | 8/1998 | Marshall |
| 5,790,645 A * | 8/1998 | Fawcett et al. .............. 379/189 |
| 5,805,670 A | 9/1998 | Pons et al. |
| 5,844,972 A | 12/1998 | Jagadish et al. |
| 5,854,975 A | 12/1998 | Fougnies et al. |
| 5,870,459 A * | 2/1999 | Phillips et al. ............... 455/409 |
| 5,909,485 A | 6/1999 | Martin et al. |
| 5,946,380 A | 8/1999 | Cohen et al. |
| 5,963,859 A | 10/1999 | Keating |
| 5,970,129 A | 10/1999 | Asfar |
| 6,072,860 A * | 6/2000 | Kek et al. ................. 379/88.25 |
| 6,201,856 B1 | 3/2001 | Orwick et al. |
| 6,307,926 B1 * | 10/2001 | Barton et al. ................ 379/189 |
| 6,434,227 B2 | 8/2002 | Nakamura |
| 2001/0016035 A1 * | 8/2001 | Manner .................. 379/115.01 |
| 2002/0026418 A1 * | 2/2002 | Koppel et al. ................. 705/41 |

* cited by examiner

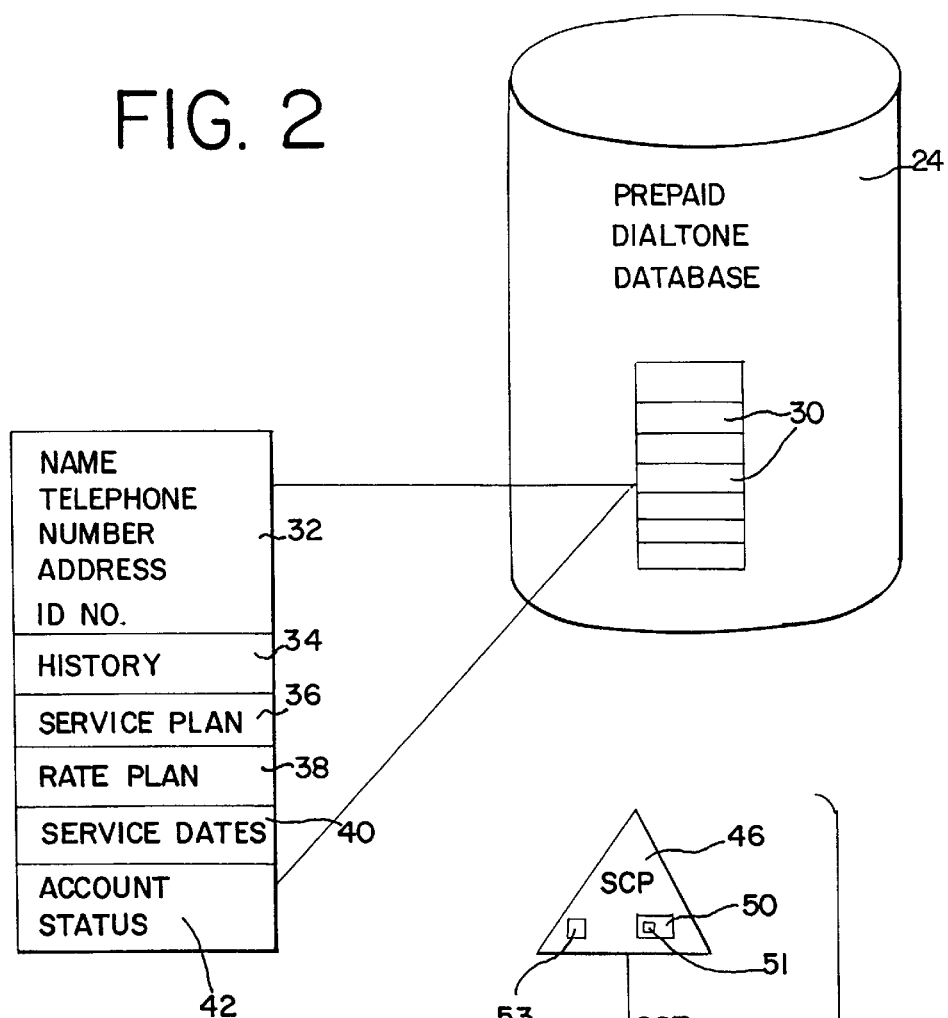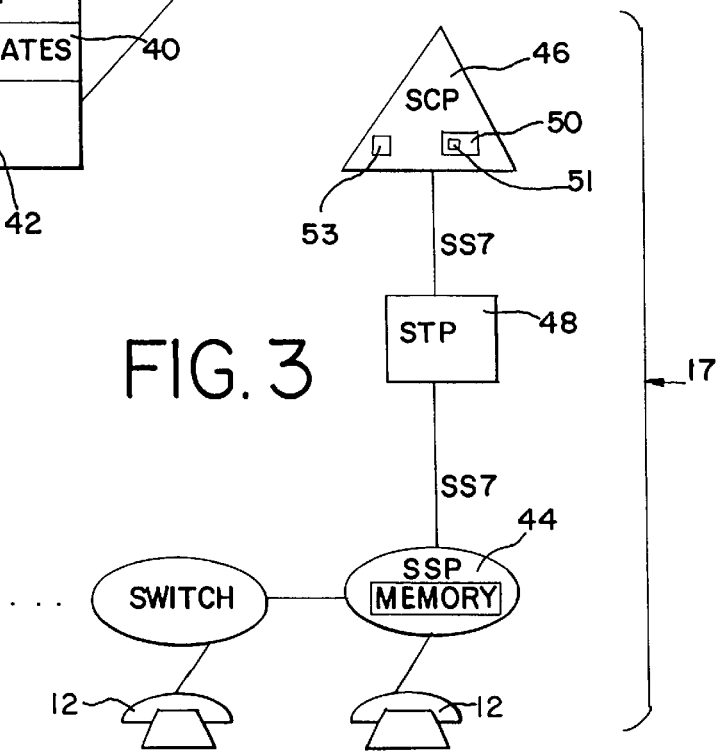

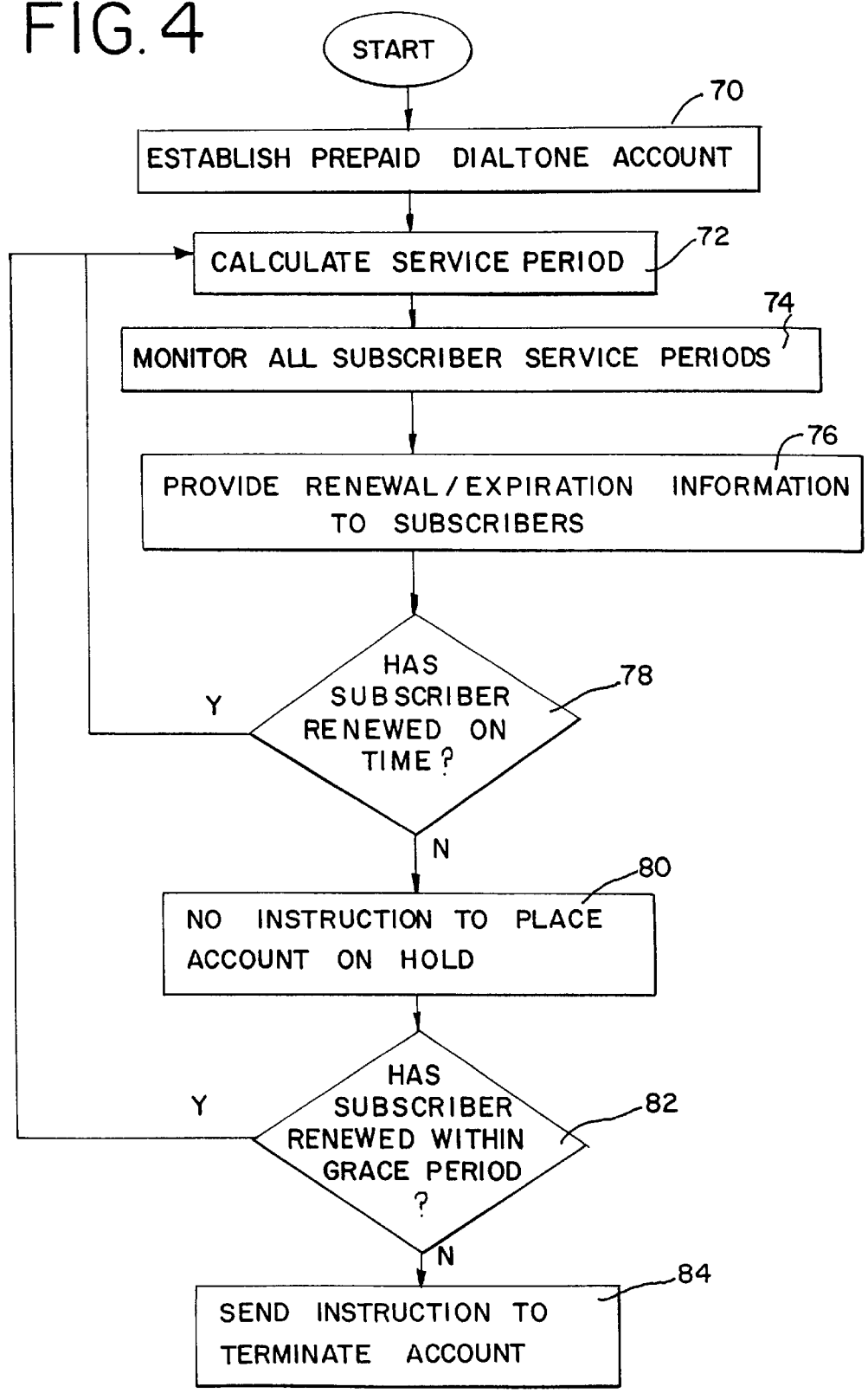

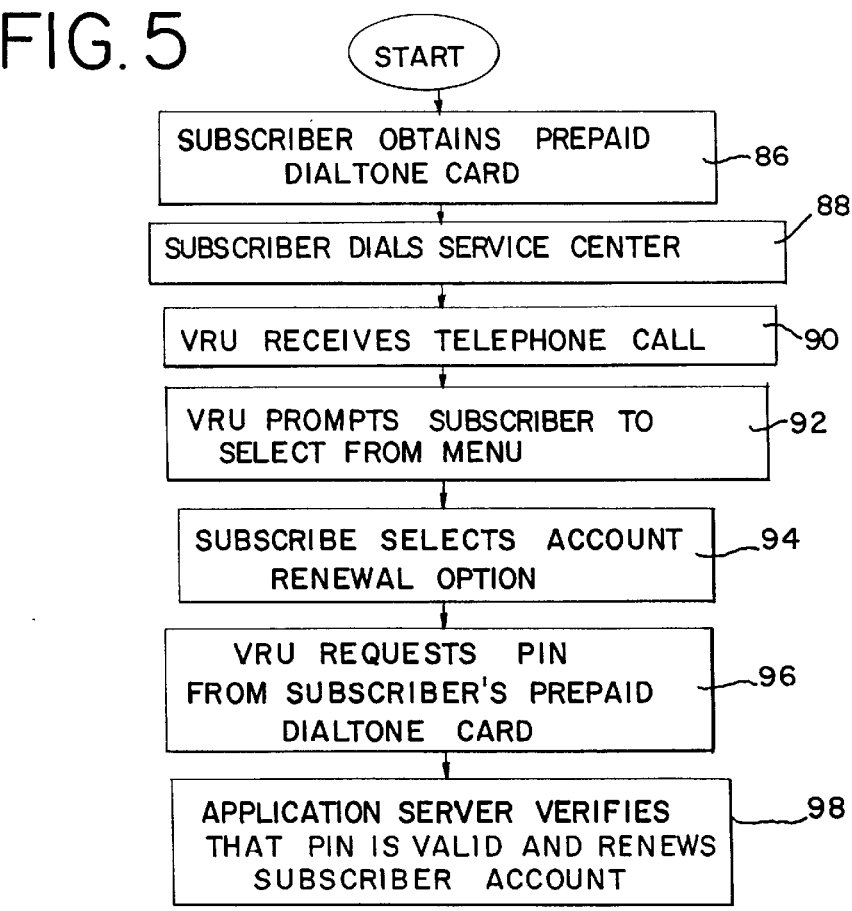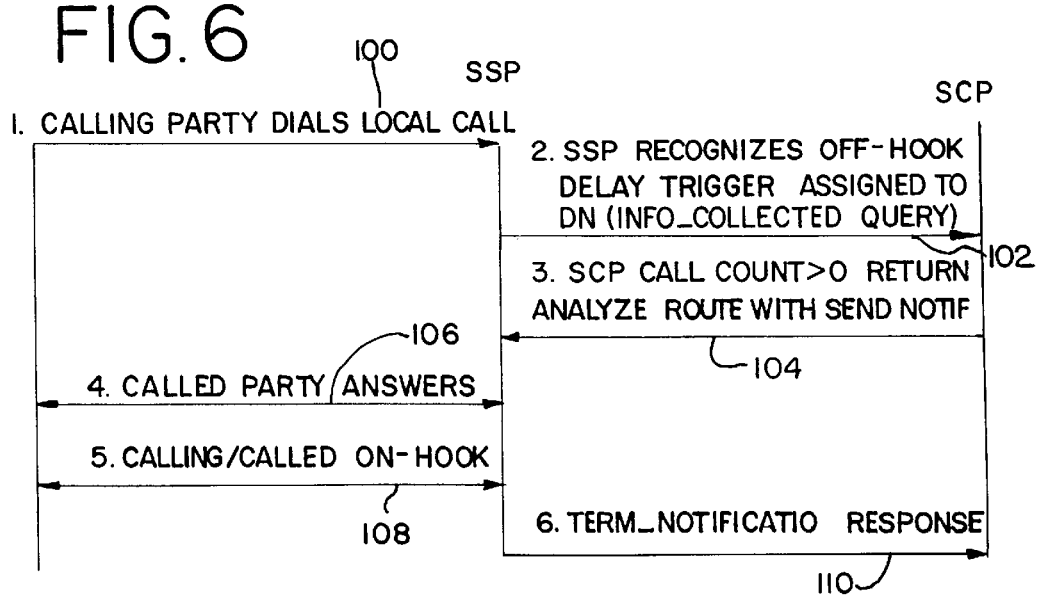

METHOD AND APPARATUS FOR PROVIDING PREPAID LOCAL TELEPHONE SERVICES IN METERED STATES

CROSS REFERENCE TO RELATED APPLICATIONS

This application is a continuation-in-part of co-pending U.S. application Ser. No. 09/417,266, filed Oct. 12, 1999, the entirety of which is incorporated by reference herein.

BACKGROUND

Subscribers of local telephone services often sign up for telephone services that are billed out on a monthly basis. Occasionally, some subscribers who are financially capable of paying their bills have difficulty making timely payments for their local telephone services. These late payments result in late payment penalties for the subscriber and added costs to the telephone service provider. In extreme cases, the subscriber's delinquency can adversely affect her credit rating. In an attempt to solve this problem, several types of prepaid telephone services are available that allow for a subscriber to prepay for services.

One existing type of system treats prepaid local telephone services (hereinafter "prepaid dialtone") in the same manner as a conventional long distance prepaid card service. The local exchange carrier (LEC) and/or interexchange carrier (IXC) for a particular subscriber will forward all calls to a dedicated prepaid dialtone switch that will determine if the caller has a credit balance in her account. If the prepaid dialtone switch determines that the call can go through, it then routes the call to the local end office and maintains an active connection to the call so that the prepaid dialtone switch may monitor the call and update its database after the call. A disadvantage of this form of prepaid dialtone is that the telephone network needs to maintain a continuous connection to the database monitoring the prepaid subscriber so that the time of the call is monitored and the charges will be debited on, for instance, a per second basis.

Another version of a prepaid dialtone system utilizes a separate billing service that generates monthly statements and posts deposits received. This system acts to accept prepayment of services but does not adequately address the problem of late payments because there is no mechanism for automatically limiting a subscriber's usage or automatically shutting off the subscriber's service at the end of the prepaid service period.

Accordingly, there is a need for an improved system and method of implementing prepaid dialtone services.

BRIEF DESCRIPTION OF THE DRAWINGS

FIG. 2 illustrates a prepaid dialtone database for use in the system of FIG. 1;

FIG. 3 illustrates an advanced intelligent network structure in a local exchange carrier configured to cooperate with the system of FIG. 1;

FIG. 4 is a flow diagram of a method of implementing prepaid dialtone services with the system of FIG. 1;

FIG. 5 is a flow diagram of a method of renewing a prepaid dialtone account according to a preferred embodiment;

FIG. 6 is a call flow diagram according to a presently preferred embodiment.

DETAILED DESCRIPTION OF THE PRESENTLY PREFERRED EMBODIMENTS

Figure 1:
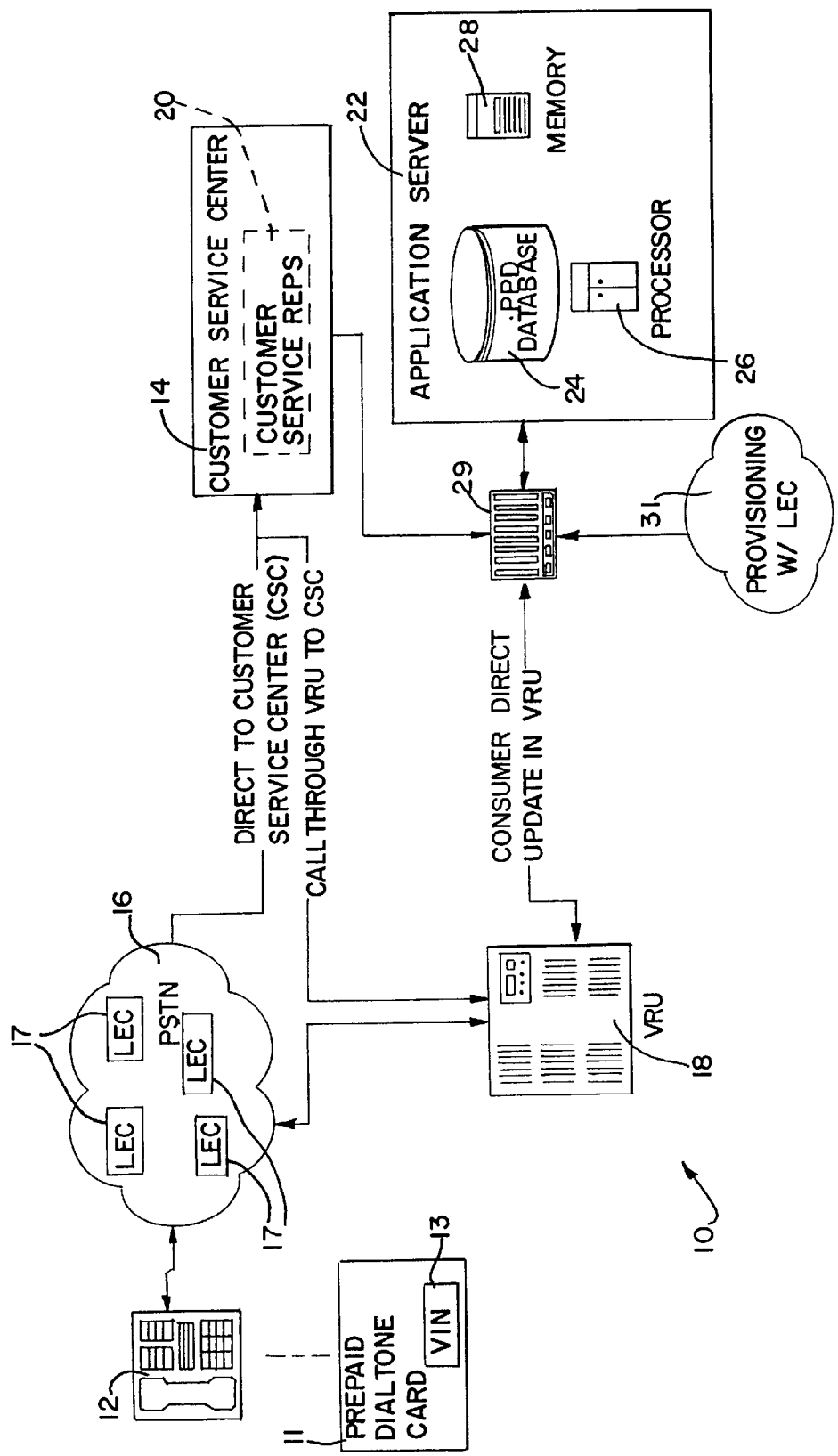
FIG. 1 illustrates a prepaid local telephone service applications system according to a preferred embodiment.

The present invention provides for an efficient and configurable system and method for implementing and monitoring prepaid dialtone services that avoids the billing difficulties and telephone network resource usage of existing versions of prepaid dialtone services. FIG. 1 illustrates a telecommunications system 10 according to a preferred embodiment. The system preferably includes at least one subscriber at a subscriber telephone 12 in communication with a prepaid local telephone service center 14 via a service provider network, often referred to as a local exchange carrier (LEC) 17, that is part of the public switched telephone network (PSTN) 16. The subscriber telephone 12 may communicate directly with the prepaid local telephone service customer service center 14 directly or via a voice recognition unit (VRU) 18. The subscriber telephone may be a plain old telephone system (POTS) telephone in communication with a standard subscriber line that provides telephone service to the subscriber's fixed address. As set forth in more detail below, each LEC 17 preferably has advanced intelligent network (AIN) capabilities. The VRU 18 may be any of a number of commonly available VRU's, such as those available from Dialogic Communications Corporation of Franklin, Tenn., that offer voice and touch tone recognition and response abilities. Preferably, the VRU will be configured to query callers of the service center 14 for information and provide automated account information.

The service center 14 includes at least one customer service agent 20 for receiving initial prepaid dialtone service requests and general customer service questions. Each customer service agent 20 receives a call from a subscriber after the subscriber has been screened by the VRU 18 to determine the subscriber's needs. Alternatively, the subscriber may access the customer service center without going through the VRU. The service center is in communication with an application server 22, such as those commonly available from IBM Corporation, containing a prepaid dialtone database 24, a processor 26 and a memory 28. Preferably the processor 26 of the applications server 22 monitors the status of the various subscriber records and manages communications with the telephone network 16 and other resources. In one embodiment, the customer service center 14, VRU 18 and application server 22 may communicate through a hub 29. A provisioning network 31 receives account activation and subsequent account status information generated by the customer service center 14 or applications server 22, via hub 29, when a prepaid dialtone subscriber establishes an account or when the account status changes. The provisioning information generated by the customer service center 14 or application server 22 may reach the LEC 17 for the subscriber through any of a number of provisioning channels that the particular LEC already uses when provisioning services.

As shown in FIG. 2, the prepaid dialtone database 24 includes a record 30 for each subscriber to the prepaid dialtone service. Each record 30 preferably contains fields for subscriber identification 32 and history 34, the applicable service plan 36, the rate plan 38 (e.g., the cost for the service period associated with the service plan), the service dates 40, and account status 42. The subscriber identification field 32 may include information such as subscriber name, telephone number, address and a unique subscriber ID. The subscriber history field 34 may include two types of information: customer service notes and transaction records. The customer service notes may contain information entered by customer service agents 20 who have previously spoken with the subscriber. The transaction records are a log of service activations and renewals that are automatically generated when a subscriber initiates or renews the prepaid dialtone service. Transaction records may include previous activation dates, times and dollar amounts, as well as the value identification number (VIN) 13 of the prepaid dialtone service card 11 (see FIG. 1) used and the telephone number from which the activation/renewal call was made.

The account status field 42 reflects whether a prepaid dialtone subscriber account is active or on hold. The service plan field 36 of the subscriber record 30 contains a product code representative of the specific version of prepaid dialtone service applicable to the subscriber. The service dates field 40 stores the start and end dates of the present period for which the prepaid dialtone service is active.

As shown in FIG. 3, a suitable LEC 17 may be an advanced intelligent network (AIN) capable network. The network may include one or more service switching points (SSP) 44 in communication with one or more service control points (SCP) 46 via one or more service transfer points (STP) 48. A subscriber telephone 12 preferably is in communication with an SSP 44 over a voice channel.

The SSP 44 is a programmable switch having the ability to recognize AIN triggers for calls requiring special services. The SSP 44 may be an end office or tandem switch and communicates with a SCP 46. The subscriber telephone 12 communicates with the SSP 44 over a voice/information channel such as an ordinary telephone line. Multiple connections and combinations of network elements are usable with the present invention. For example, a subscriber on a subscriber telephone 12 may also communicate with a SSP 44 through one or more ordinary switches. In one preferred embodiment, the SSP is configured to receive and store line class codes from the LEC provisioning system 31 (FIG. 1) representative of the version of prepaid dialtone service offered by the particular LEC. The line class code is associated with a particular subscribers telephone number and instructs the SSP to, for example, verify that calls from the subscriber are of the type permitted under the subscribed prepaid dialtone services.

The service control point (SCP) 46 is a network element containing logic and data necessary to provide functionality required for the execution of a desired communication service. A SCP 46 generally permits separation of service logic from switching functionality such that additional services may be developed without the need to provision significant software in each individual SSP. A suitable SCP 46 is the Advantage SCP manufactured by Lucent Technologies. In a preferred embodiment, the SCP 46 contains service logic for prepaid dialtone services and is also configured to receive a set of records of subscriber names, their telephone numbers and the service time limit at provisioning. This subscriber information originates in the service center 14 and the records are stored in the application server 22 and the memory 50 in the SCP 46. The memory 50 may be integral with the SCP or may be a separate memory device accessible by the SCP 46. In one preferred embodiment, wherein a prepaid dialtone service is implemented in a metered call state (as defined below), the SCPs 46 in metered state LECs 17 also may include a call counter 51 for each prepaid dialtone subscriber in the SCP memory 50 as well as a notification timer 53 useful in the process of counting the number of prepaid calls for prepaid dialtone subscribers in metered states. The notification timer may be implemented using commonly available programming operative on the SCP.

The SCP 46 communicates with SSPs 44 over a data channel via at least one service transfer point (STP) 48. A suitable data signal intended for use with the STPs is the American National Standards Institute (ANSI) signaling system No. 7 (SS7). A suitable SCP/SSP communication protocol is the AIN 0.1 SCP/SSP protocol set forth in Bellcore Technical Reference TR-NWT-001285, entitled AIN Switch-Service Control Point Application Protocol Interface Generic Requirements, Issue 1, August 1992. Other configurations of AIN capable networks may be used to implement a preferred method and system for providing prepaid dialtone services. Additionally, multiple service provider networks, also referred to herein as local exchange carriers (LECs) 17, may access the services of the prepaid dialtone provisioning system 10 so that the prepaid dialtone provisioning system will monitor and maintain all subscriber account records for each of the LECs 17.

In one embodiment, the SSP 44 may be configured to recognize an off-hook delay trigger from a subscriber line when a subscriber picks up the telephone and dials a number. If the subscriber is a prepaid dialtone subscriber, the SSP preferably contains a line class code associated with the subscriber's telephone number. The line class code for prepaid dialtone subscribers contains instructions for the SSP to verify that the telephone number dialed by the subscriber is a non-toll intra-LATA (Local Access and Transport Area), toll-free, or 911-call. If the SSP determines that the number does not fall within the allowable category of calls, the call is not connected. Instead, the off-hook delay trigger is escaped and the call is terminated to treatment in the SSP. If the call made by the prepaid dialtone subscriber is an allowable call, the SSP communicates with the SCP and the SCP verifies that the prepaid dialtone account for the subscriber is valid. If the account is still valid, the SCP instructs the SSP to connect the call.

Referring now to FIG. 4, a method of implementing prepaid dialtone service is described below with relation to the system shown in FIGS. 1–3. When a subscriber 12 desires to participate in the prepaid dialtone service, the subscriber must first purchase a prepaid dialtone card 11. The cards may be purchased from designated retail establishments. The cards will each have a unique value identification number (VIN) that associates a fixed value to a particular card in a prepaid telephone card database. Once a card 11 has been purchased, the customer service center 14 and the VRU 18 will serve as the primary interface for providing the service to the subscriber 12. Although a card having a unique VIN is described herein, a card is not necessary. The VIN may be printed on other items, or may be verbally provided to a subscriber upon purchase, in other embodiments.

To initiate service after purchasing a card 11, the subscriber 12 will call into the service center 14 to initiate service. In one embodiment, all calls to the service center first arrive at a VRU that screens the call and offers a menu of touchtone response options to direct the call to an appropriate location. In other embodiments, calls to the service center may arrive directly at the service center 14. The service center 14 may be a live operator who, in real time, assists the caller. In another embodiment, the service center may be an Internet-based service center capable of accepting and processing service requests. The subscriber 12 will provide the customer service agent 20 with information such as the address for the service and the VIN number 13 of the card 11. After verifying the address information and verifying that the VIN number 13 is valid, the customer service agent 20 will provide the subscriber with a telephone number and installation date for the service.

The customer service agent will communicate with the applications server 22 to initiate a service order that may be processed through a standard automated provisioning system in communication with the LEC 17 for the subscriber 12. Preferably the interface used for provisioning the prepaid dialtone service is an interface such as a standard electronic data interface (EDI) or other type of interface which is capable of connecting to customized interfaces used by the specific LECs of the subscribers to the prepaid dialtone service. After receiving a new prepaid dialtone service request, the service order is entered on the prepaid dialtone database and a provisioning request will be sent to provisioning system 31 and, in a preferred embodiment, results in all the necessary Universal Service Order Codes (USOCs), line class code orders, and field identifiers (FIDs) for the requested version of prepaid dialtone being delivered to the LEC. The USOC is preferably a package USOC that defines a set of individual feature USOCs (e.g., call waiting, voicemail, etc.). Thus, the package USOC represents to the LEC the general type of service order and all the individual features packaged into the service order. In another embodiment, individual feature USOCs may be used in an unbundled form to provide the service order. Line class codes refer to a switch based translator for a particular service that decides which call features are allowed and FIDs refer to codes in a service order that are related to particular services or features.

In a preferred embodiment, the LEC 17 may implement the prepaid dialtone service in one of two ways depending on the state rules for handling local telephone calls. In states such as Ohio and Indiana where there is no metered service for local calls, the LEC may implement the prepaid dialtone service for a particular subscriber by storing a line class code associated with the subscriber and the prepaid dialtone service in the SSP. In a preferred embodiment, the SCP does not interact with the SSP and the SSP handles all prepaid dialtone calls. In another embodiment, the LEC of states with no metered service for local calls may provide the appropriate SCP with the subscriber's telephone number and an account status indicator (e.g., a variable indicating whether the subscriber account is current or expired) to a memory 50 (see FIG. 3) associated with, or in communication with, an SCP 46 so that the SCP may control whether the SSP may continue connecting local telephone calls for the subscriber. With this network implementation of the prepaid dialtone service, the SSP 44 and SCP 46 cooperate to make sure the subscriber's prepaid dialtone account is current and that the call made by the subscriber is a local call. In either embodiment, the LEC does not continuously meter the call, debit a monetary amount associated with a call, or put a limit on the time of any local calls. Other network implementations, such as an AIN network where the SCP performs both the tasks of identifying local calls and account status, are also contemplated.

In states where the local telephone services are metered, for example in Illinois, Wisconsin or Michigan, the LEC 17 will again preferably provide the SSP with a line class code associated with the subscriber's telephone number that will cause the SSP to permit local calls. In metered states, however, the prepaid telephone services are implemented in the SCP by providing the SCP 46 with the subscriber's telephone number, a day counter and a call counter to provide a fixed number of local telephone calls to a subscriber for a given service period. The number of calls allowed may be set at a number greater than the average number of calls subscribers make in a given time period to allow for normal calling habits. For example, assuming that 270 calls per month is the average number of calls, the SCP may be programmed to allow 400 calls in a thirty day period for prepaid dialtone subscribers. As with LECs in the non-metered states, the SCP and SSP do not continuously monitor prepaid telephone calls, do not associate a value/rate with a call or debit a value from an account, and do not limit the length of local telephone calls. In the metered call states, however, the SCP will keep track of a set service period, decrement a call counter every time a local call is completed, and prohibit all calls after a predetermined number of calls have been completed in the service period.

In either situation, metered state or non-metered state, the SCP preferably does not communicate with the prepaid database. As shown in FIG. 4, the prepaid database 24 keeps track of the service period for each subscriber 12 and operates to automatically remind subscribers of service expiration due dates and automatically communicate service order changes to the LEC if a prepaid dialtone subscriber's account status has changed. As soon as an account is established (at 70), the prepaid subscriber database determines the service period end date for the subscriber (at 72). In one embodiment, a subscriber may renew for a fixed 30 day period. For new subscribers, the application server 22 will determine the date corresponding to 30 days from the service installation date and store that information in the service dates field 40 of the subscriber record 30 in the prepaid dialtone database 24. For renewing subscribers, the applications server will determine the date corresponding to thirty days from the end of the subscriber's current service period. For renewing subscribers who are renewing after the expiration of their previous service period, but before the expiration of the grace period (see below), the service period end date is calculated as 30 days from the date the subscriber's service becomes active. As with new subscribers, the service period dates are stored in the service dates field 40 of the subscriber record 30. Although a service period of 30 days is specifically addressed her, any service period length may be implemented as desired.

After determining the service period, the applications server 22 monitors the subscriber service periods by scanning the prepaid dialtone database 24 on a daily basis (at 74). At a desired time before the expiration of a subscriber's service period, the applications server will send instructions to a notification service to automatically notify the subscriber that the service period will expire in a certain number of days (at 76). In one embodiment, the automatic notification may be in the form of a voice mail that supplies termination date information and is automatically generated and delivered five days before the service period expires. In another embodiment, the notification service may be an automatic calling device that will telephone the subscriber and play a prerecorded reminder message. In other embodiments, an additional renewal reminder message may be provided, other reminder periods may be implemented or the subscriber may be given the option of selecting how far in advance she wishes to be reminded to renew and/or informed of a service termination date.

After notifying the subscriber, the applications server continues to keep track of subscriber account status and check on whether the subscriber has renewed (at 78). If the subscriber has renewed, the process begins again with the applications server calculating the new service period and so on. If the service period expires and the subscriber has not renewed in time, the applications server generates an instruction directed to the subscriber's LEC 17 to change the subscriber account status (at 80). In a preferred embodiment, the applications server allows the subscriber a grace period in which to renew her account by instructing the LEC to put the account on hold, such as a vacation-type hold or other suspend/hold-type account, for example where no dialtone service is provided but where the telephone line is still connected. In this manner, the prepaid dialtone subscriber is given a period of time to renew the account without the account being terminated and the subscriber having to pay a fee for reconnecting the telephone service and receiving a new telephone number in addition to renewing the prepaid dialtone service. In another embodiment, the prepaid dialtone service may allow for emergency calls, such as a 911 call, during the grace period while blocking all other call attempts.

The applications server will continue to monitor the subscriber's account on a daily basis during a predetermined grace period to see if a renewal has been received (at 82). The grace period may be any desired length of time and in a preferred embodiment is five days. At the end of the grace period, the applications server will automatically send instructions to the LEC to terminate and disconnect the subscriber's telephone service (at 84). In other embodiments, the applications server may just automatically send a termination order to the LEC at the end of the subscriber's service period so that the prepaid telephone service and the telephone line are terminated immediately after the service period expiration date.

Referring now to FIG. 5, a process for renewing a prepaid dialtone service account is shown. While a subscriber's account is still active, or within a grace period after expiration of the prepaid dialtone service period, the subscriber may renew her account for another service period. The subscriber will again obtain a non-reusable prepaid dialtone card having a fixed monetary value from a retail location (at 86). The subscriber will dial a service center 14 telephone number and a VRU 18 will receive the telephone call (at 88, 90). The VRU 18 will prompt the subscriber to select from a menu of options and the subscriber will select the account renewal option (at 92, 94).

When the VRU receives the subscriber's menu selection, the VRU will then request information from the subscriber including the VIN number of the prepaid dialtone card that the subscriber purchased (at 96). In one embodiment, the VRU 18 will determine if the caller is calling from her home and match the automatic number identification (ANI) information of the home number to an established prepaid dialtone account. The VRU 18, via the applications server 14, will verify with the prepaid dialtone card database that the VIN is valid and that the monetary value represented by the card is sufficient for the services requested. The applications server will renew the subscriber's account for another service period once the VIN and amount are verified (at 98). The VRU may also inform the subscriber of the new end date of the prepaid dialtone service she has just purchased.

In another embodiment, subscribers may pay for prepaid telephone service using a credit card rather than a single use prepaid dialtone card purchased at a retailer. In this embodiment, the VRU would ask the subscriber to select between a prepaid .card or a credit card as a method of payment, and the applications server would interact with the appropriate credit agency to determine if the credit card transaction is valid.

An advantage of the presently preferred system and method is that use of LEC resources is minimized. The LEC is not required to constantly monitor prepaid telephone calls and does not keep track of monetary values associated with subscriber accounts. Communication with the service center 14 is minimal and does not tie up LEC resources. In one embodiment, the LEC will maintain a call counter and a service period clock for prepaid dialtone subscribers in metered states. In non-metered states, no call counter or service period clock is necessary. Preferably, the service center, via a provisioning network, only communicates with an LEC to initially establish prepaid dialtone services or to change the status of an account if a subscriber fails to renew or renews late.

Unless the service center communicates information to the contrary, the LECs will automatically maintain active status for currently active prepaid dialtone subscribers. In metered states, the LEC will automatically reset the service period and call counter stored in memory 50 in the SCP 46 at the end of a given subscriber's service period. In non-metered states, the LEC will maintain active status for the prepaid subscribers unless a special instruction (such as a hold or a disconnect instruction) is received. In this manner, LEC resources are not burdened by the bulk of the administrative overhead of managing the prepaid subscribers. Instead, the subscriber accounts and account maintenance are handled by the remotely located service center 14.

In a preferred embodiment, different types of prepaid dialtone services may be offered using the disclosed system and method. For example, in one embodiment subscribers may be able to select a basic or a premium service for prepaid dialtone. Both basic and premium services could be based on a 30-day service period. The basic service features may include basic dialtone, a state-specific local calling plan, a directory listing, toll call blocking, PIC none (designating a feature that blocks a subscriber from utilizing long distance services), directory assistance (DA) and directory assistance with call completion (DACC) blocking, operator call (0+/0−) blocking except in areas without 911, listing services, and no customer billing. The state-specific local calling plans may be as follows based on state/regional call metering regulations: Indiana and Ohio—unlimited local calling; Illinois (bands A & B calling permitted, band C blocked), Michigan, and Wisconsin—a preset limit on the number of local telephone calls allowed per service period. The basic prepaid dialtone service preferably has its own USOC, line class codes and FIDs and these would be invoked by the service instructions sent out to the LEC by the applications server. The premium service may include all the features of the basic service and the following features: voice mail, caller ID with name, call waiting, and non-published listing. As with the basic service, the premium service preferably has its own packaged USOC defining all the aspects of the service to the LEC supporting the subscriber.

In addition to the basic sign-up and renewal functions described above, the service center, via the VRU may allow subscribers who have existing prepaid dialtone service to retrieve account information on an as-needed basis. Utilizing the same telephone number that allows for the subscriber to sign-up for and renew service, preferably a toll-free number, a subscriber may access information offered by menu driven commands at the VRU. Such information may include the type of prepaid service the subscriber has established, the date the prepaid service will expire, etc. The VRU 18 preferably also allows subscribers to select an option to be connected to a customer service agent 20.

Referring now to FIGS. 6 and 7, a preferred implementation of prepaid dialtone service in metered call states, such as Illinois, Michigan and Wisconsin, is illustrated. As shown in FIG. 6, the basic call flow for a call initiated by a prepaid dialtone subscriber in a metered state begins with a subscriber dialing a local call 100 that is received at an SSP. If the dialed digits of the call correspond to a permissible telephone call (i.e. intralata local, toll free or 911) the SSP will recognize an off-hook delay trigger assigned to the directory number (DN) of the subscriber and forward an info_collected query 102 to the service control point (SCP). The SCP, upon receiving the query from the SSP, will verify that the subscriber has a prepaid subscription and send an analyze_route response and send_notification message 104 to the SSP. The SSP will then route the call to the dialed number and, when the called party at the dialed number answers the call, establishes communication between the calling party and the called party 106. At the conclusion of the call, the called and/or calling party will go on-hook (i.e., disconnect from the call) 108. The SSP will sense the call termination and forward a termination notification response message to the SCP 110.

Figure 7A:
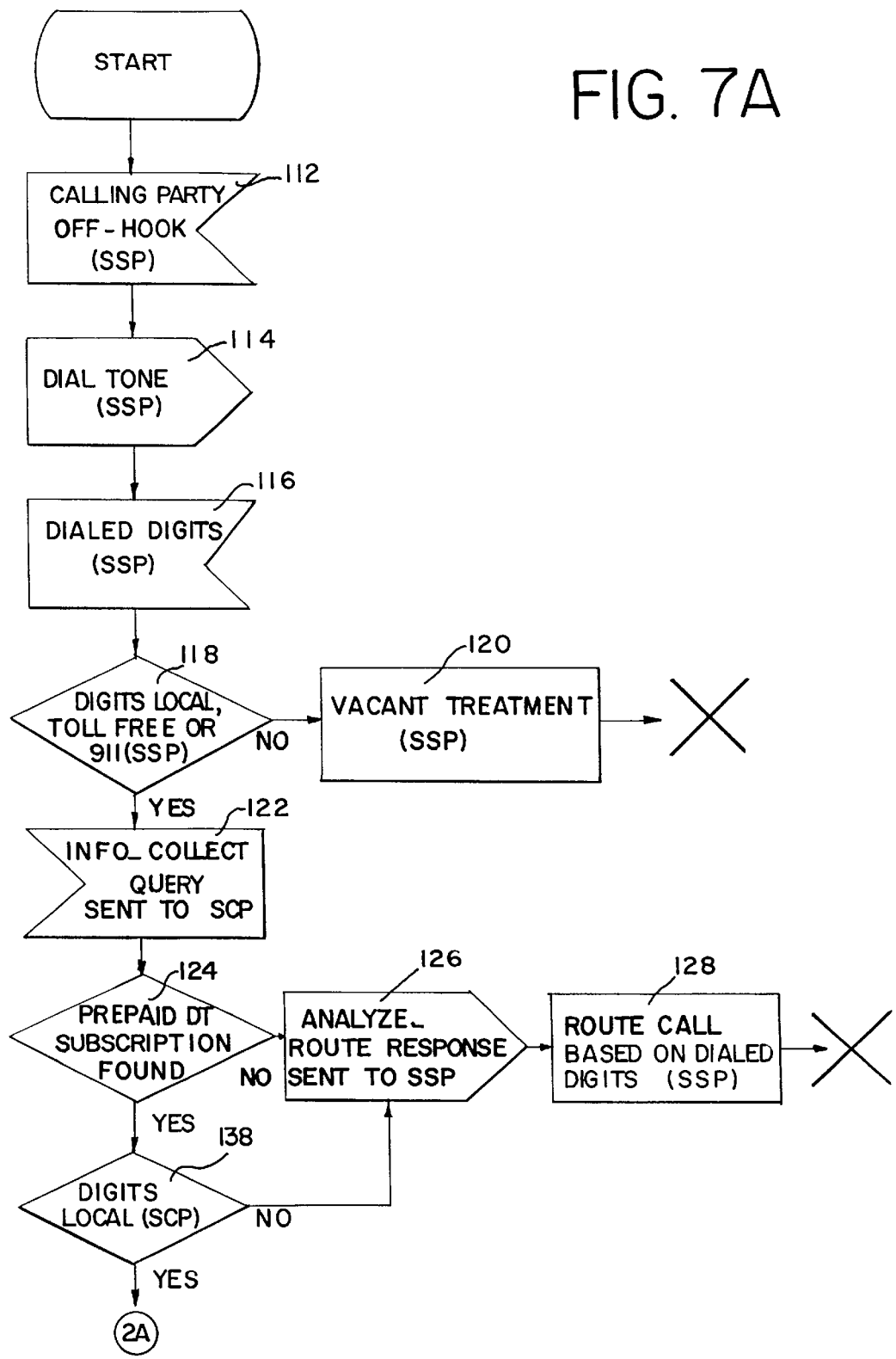
FIGS. 7A–7C are a flow chart illustrating the call processing logic used to provide prepaid dialtone services in metered call states according to a presently preferred embodiment.
Figure 7B:
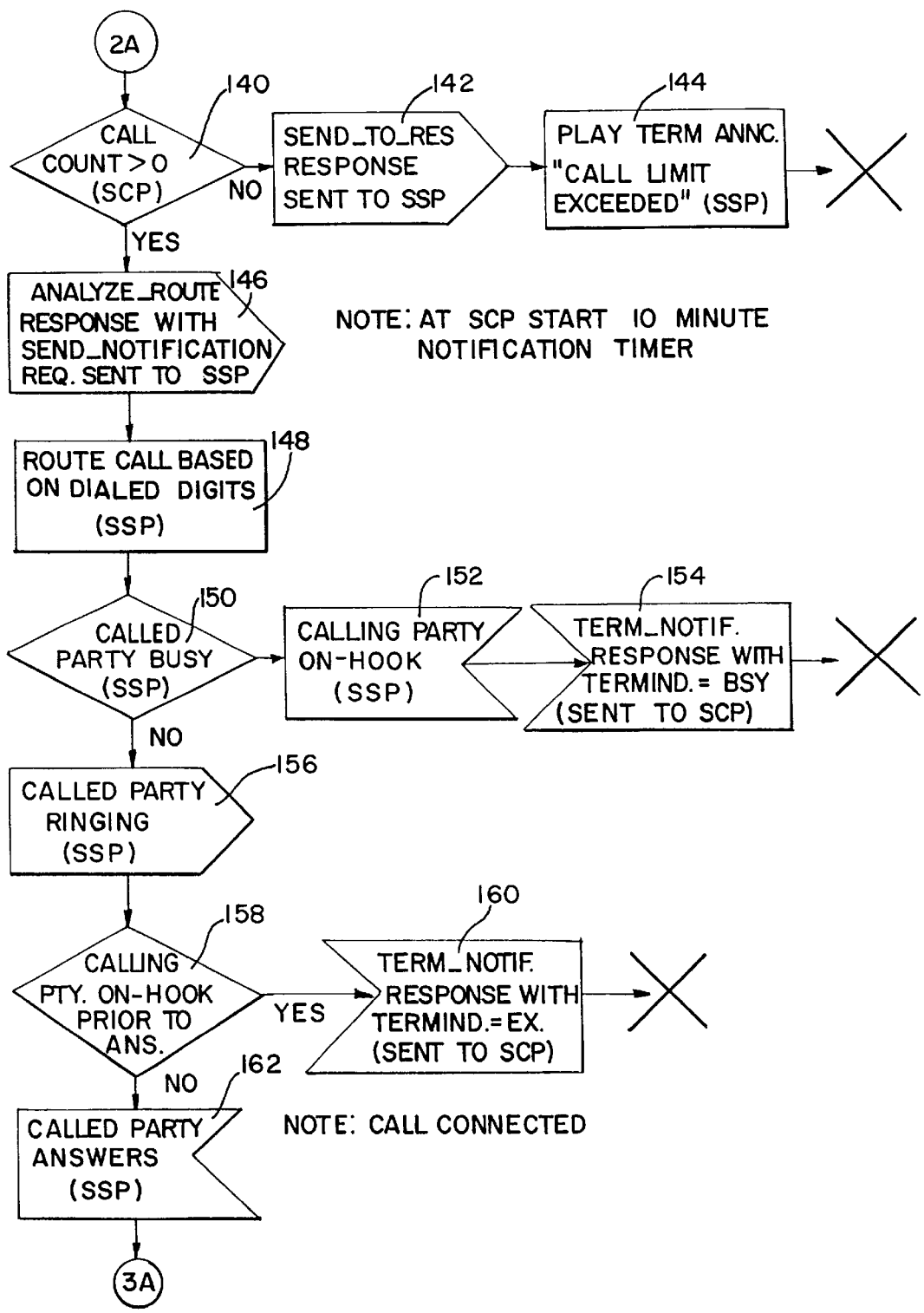
Figure 7C:
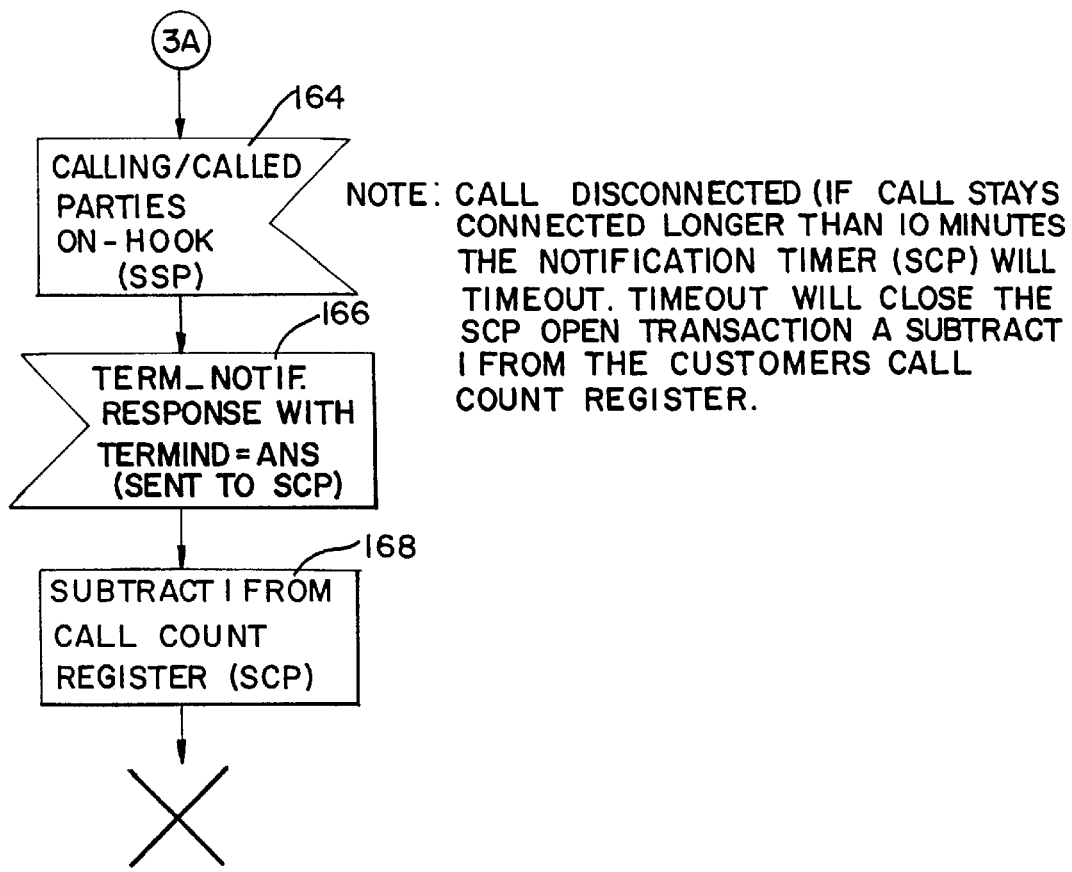

In FIG. 6, a call flow is illustrated assuming that the calling party is a prepaid subscriber, that the prepaid subscriber has not exceeded her call limit for the applicable time period (e.g. 30 day cycle), and that the called party answers the call. FIGS. 7A–7C demonstrate one preferred embodiment for metering the number of calls made by a prepaid dialtone subscriber and handling the various possible call answering scenarios, including busy signals and unanswered calls. Preferably, the metering system implemented on the advance intelligent network (AIN) system provides prepaid dialtone subscribers a ceiling of 400 calls within a 30 day cycle. The AIN network will deny all local calls from the residential phone of the prepaid dialtone customer, allowing only toll free and 911 calls, after expiration of the 30 day period or extension of the 400 calls available for that 30 day period. After the subscriber reaches a limit of 30 days or 400 calls, the subscriber must use a prepaid long distance telephone card purchased from one of a number of prepaid long distance card vendors, or use some other toll free pre-arranged billing option not associated with the prepaid dialtone for local calls. Although a prepaid dialtone subscriber's telephone calls to that subscriber's own voicemail account may be excepted from the limitation of 400 calls permitted per month, preferably all calls associated with that prepaid dialtone subscriber's residential phone will be counted, including calls to the subscriber's voicemail. This would include the calls a subscriber receives that are forwarded to her voicemail as well as calls from the prepaid dialtone subscriber to pick up the voicemail messages.

As shown in FIG. 7A, the calling party first picks up the telephone associated with the prepaid dialtone subscriber's account and sends an off-hook signal to the SSP 112. In response, the SSP provides a dialtone 114 to the telephone and the dialed digits from the calling party are received at the SSP 116. If the calling party is a prepaid dialtone subscriber, then the off-hook delay trigger from the subscriber line will be recognized by the SSP and an SSP line class code (LCC) will verify that the dialed digits are intralata local, toll-free, or 911 118. If the SSP sees digits for a call that is not allowable, the SSP will escape the off-hook delay trigger and route the call to vacant treatment 120, consisting of playing a message such as "the call you are making is not allowed" and terminating the call, or simply terminating the call. If the dialed digits detected by the SSP are allowable, the call will encounter an off-hook delay trigger and the SSP will forward an info collected query to the SCP 122.

Upon receipt of the info_collected query from the SSP, the SCP will determine if the subscriber has a valid prepaid dialtone subscription 124. If a prepaid dialtone subscription is not found associated with the calling party, the SCP will send an analyze route response back to the SSP and the SSP will route the call based on the dialed digits. Even though no prepaid dialtone subscription has been found at the SCP, the SCP will assume that the caller has a valid subscription and note the discrepancy. There may be instances where subscriber information was properly updated at the SSP but not at the SCP, so the caller is given the benefit of the doubt until the SCP operator can verify account status.

Alternatively, if a prepaid dialtone subscription is identified for the calling party, the SCP service logic will determine if the call is an intralata local call, toll-free call, or 911 call at 138. If the call is toll free or 911, the SCP will send an analyze_route response message back to the SSP and the call will be routed based on the dialed digits. If the call is a proper intralata local call, the SCP will verify 140 that the subscriber's call count is greater than 0. If the call count is 0, the SCP will send a send_to_resource response message to the SSP 142 instructing the SSP to terminate the call and play a terminating announcement such as "your call limit has been exceeded" 144. If the prepaid dialtone subscriber has remaining telephone calls left (i.e. the call count is greater than 0), the SCP sends an analyze route message with send-notification request to the SSP 146 whose combination of analyze route responses and send notification request messages is known as a multiple component message. At the same time that the multiple component message is sent out, the SCP will also start a notification timer associated with the open transaction from the send notification request. As discussed in greater detail below, the notification timer is used to determine when the prepaid dialtone subscriber's call count should be decremented in to limit the amount of time that an SCP is tied to processing a prepaid dialtone telephone call.

The SSP, upon receipt of the multiple component message from the SCP, routes the call based on the received dialed digits 148. If the called party is busy, the SSP will send a termination notification response message to the SSP with the termination indicator set to busy (at 150, 152 and 154). Another potential scenario for a call from a prepaid dialtone subscriber is for the prepaid dialtone subscriber to call a party whose telephone continues to ring 156 but who fails to answer and the calling party hangs up before the call is ever answered 158. In this situation a termination notification response with the termination indicator set to "exception" 160 is sent to the SCP by the SSP. In both the case of a busy signal and the case where there is no answer, the termination notification message preferably stops the notification timer in the SCP so that the SCP will not decrement the call counter. In order to avoid the notification timer expiring prior to receipt of the termination notification, the notification timer is preferably set for a time period sufficient to take into account reasonable delay by the calling party in hanging up the telephone. In the one preferred embodiment, the notification timer is set to a time period of 10 minutes. Finally, assuming that the called party answers the telephone call from the prepaid dialtone subscriber 162, the call counter at the SCP will preferably be decremented in one of two ways. First, if the calling and called parties go on-hook 164 prior to the expiration of the notification timer, the SSP sends a termination notification response with the termination indicator set to "answer" 166 which will automatically cause the SCP to subtract one from the call count register 168. Alternatively, the expiration of the notification timer at the SCP (i.e. a telephone conversation lasting longer than the length of the notification timer) will also automatically subtract one from the subscriber's call count register at the SCP. In addition, the expiration of the notification timer automatically closes the transaction of the call with the SCP such that the SCP is no longer tied up by the telephone call between the called and calling parties.

As has been described above, a system and method for providing prepaid local telephone service for subscribers at specific land-line telephone service addresses is provided for metered call states. Qualified local calls are limited by service period and number of calls per service period, and not a per-call time charge. LEC resources are not burdened by the continuous monitoring and administrative tasks of previous systems because the SCP is automatically removed from the telephone call and does not track lengths of calls in order to determine charges. Additionally, the customer service center and application server provide prepaid dialtone plan flexibility and avoids the need to replicate efforts and specially program hardware at each and every LEC interested in offering the prepaid dialtone service described above. The preferred method can permit automated sign-up and renewal of prepaid dialtone services. The prepaid dialtone services provide subscribers with the ability to manage their telephone costs and allow LECs to reduce the billing difficulties associated with subscribers.

It is intended that the foregoing detailed description be regarded as illustrative rather than limiting, and that it be understood that the following claims, including all equivalents, are intended to define the scope of this invention.

We claim:

1. A method for providing prepaid local telephone services to a subscriber having a telecommunications device connected to a subscriber line and in communication with a telephone network via the subscriber line, the method comprising:

receiving a telephone call directed to a called party from the subscriber at a first network element;

communicating a local telephone call request from the first network element to a second network element;

determining if a maximum number of local telephone calls has been completed by the subscriber within a predetermined time period;

instructing the first network element to connect the telephone call to the called party if the subscriber has not exceeded the maximum number of local telephone calls within the predetermined time period;

initiating a notification timer in the second network element; and disengaging the second network element from the telephone call upon expiration of the notification timer.

2. The method of claim 1 further comprising changing a value of a call counter to reflect completion of a call upon expiration of the notification timer.

3. The method of claim 2 further comprising maintaining the value of a call counter if a busy signal is detected.

4. The method of claim 2 further comprising maintaining the value of the call counter if the subscriber terminates the telephone call prior to the called party answering the telephone call.

5. The method of claim 3, wherein maintaining the value of the call counter if a busy signal is detected comprises the first network element detecting a busy signal and sending a signal from the first network element to the second network element indicating that the called party is busy.

6. The method of claim 4, wherein maintaining the value of the call counter if the subscriber terminates the telephone call prior to the called party answering comprises the first network element detecting an on-hook signal from the subscriber and sending a signal from the first network element to the second network element indicating that the subscriber terminated the telephone call prior to connecting the telephone call with the called party.

7. The method of claim 1, wherein communicating a local telephone call request from the first network element further comprises verifying that the telephone call is one of an intralata local, toll-free and 911 call.

8. The method of claims 1, wherein the second network element provides a voice message to the subscriber if the maximum number of local telephone calls has already been completed by the subscriber.

9. The method of claim 1, wherein the first and second network elements comprise advanced intelligent network (AIN) elements.

10. The method of claim 9, wherein the first network element comprises a service switching point (SSP) and the second network element comprises a service control point (SCP).

11. A system for monitoring and implementing prepaid dialtone services for local telephone calls in regions having metered calling, the system comprising:

a switch for receiving telephone calls from land-line telephone subscribers to the prepaid dialtone services for local telephone calls, the switch comprising a memory containing information on the land-line subscribers and information for identifying local telephone calls; and a telephone network element in communication with the switch, the telephone network element comprising logic for determining whether a telephone call received at the switch is a local telephone call, a notification timer configured to automatically remove the telephone network element from a telephone call transaction after expiration of a predetermined time, and a call counter configured to monitor a number of local telephone calls permitted to a subscriber.

12. The method of claim 1, wherein the first network element comprises an SSP and the second network element comprises a SCP, and wherein instructing the first network element to connect the telephone call comprises the SCP sending a multicomponent message, comprising an analyze_route response and a second_notification request, to the SSP.

* * * * *

UNITED STATES PATENT AND TRADEMARK OFFICE
CERTIFICATE OF CORRECTION

PATENT NO. : 6,785,372 B1
DATED : August 31, 2004
INVENTOR(S) : John Moss et al.

It is certified that error appears in the above-identified patent and that said Letters Patent is hereby corrected as shown below:

Title page,
Item [56], References Cited, U.S. PATENT DOCUMENTS, insert the following:
-- 6,021,189      02/2000      Vu
   6,192,117 B1   02/2001      Stephan
   6,628,766 B1   09/2003      Hollis et al.
Item [56], References Cited, OTHER PUBLICATIONS, insert the following:
-- Excerpt of User's Guide entitled "ATSIII/65 Automated Long Distance Telephone Service", Version 2.0, dated October 1983, 13 pages --.

Signed and Sealed this

Twelfth Day of April, 2005

JON W. DUDAS
*Director of the United States Patent and Trademark Office*